(12) United States Patent
Sugiyama

(10) Patent No.: US 8,023,094 B2
(45) Date of Patent: *Sep. 20, 2011

(54) MONOCHROMATIC LIQUID CRYSTAL DISPLAY WITH HIGH CONTRAST RATIO

(75) Inventor: Takashi Sugiyama, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 511 days.

This patent is subject to a terminal disclaimer.

(21) Appl. No.: 12/167,349

(22) Filed: Jul. 3, 2008

(65) Prior Publication Data

US 2009/0033828 A1    Feb. 5, 2009

(30) Foreign Application Priority Data

Jul. 31, 2007 (JP) ................................ 2007-199640
Aug. 27, 2007 (JP) ................................ 2007-219638

(51) Int. Cl.
*C09K 19/02* (2006.01)
*G02F 1/1335* (2006.01)

(52) U.S. Cl. ........................ 349/180; 349/101; 349/179
(58) Field of Classification Search .................. 349/101, 349/179–180
See application file for complete search history.

(56) References Cited

U.S. PATENT DOCUMENTS

| 7,081,934 | B2 * | 7/2006 | Joten | 349/114 |
| 7,084,939 | B2 * | 8/2006 | Paukshto et al. | 349/101 |
| 2006/0285355 | A1 * | 12/2006 | Robinson et al. | 362/606 |
| 2007/0085951 | A1 * | 4/2007 | Hale et al. | 349/117 |

FOREIGN PATENT DOCUMENTS

JP    2004-062021 A    2/2004

* cited by examiner

*Primary Examiner* — Nathanael R Briggs
(74) *Attorney, Agent, or Firm* — Holtz, Holtz, Goodman & Chick PC

(57) ABSTRACT

An STN liquid crystal display, wherein a twist angle of liquid crystal molecules of the liquid crystal layer is 155° to 210°, and a first angle between a polarizing axis direction of the first polarizer and an alignment direction of liquid crystal molecules of the liquid crystal layer in contact with the first transparent substrate and a second angle between a polarizing axis direction of the second polarizer and an alignment direction of liquid crystal molecules of the liquid crystal layer in contact with the second transparent substrate are each larger than 0° and smaller than 90°, and a sum of the first and second angles is 90°±7°. The STN liquid crystal display is provided having a high contrast ratio and good characteristics of viewing angle.

8 Claims, 23 Drawing Sheets

MONOCHROMATIC LIQUID CRYSTAL DISPLAY WITH HIGH CONTRAST RATIO

CROSS REFERENCE TO RELATED APPLICATION

This application is based on and claims priority of Japanese Patent Application No. 2007-199640 filed on Jul. 31, 2007, and Japanese Patent Application No. 2007-219638 filed on Aug. 27, 2007, the entire contents of which are incorporated herein by reference.

BACKGROUND OF THE INVENTION

A) Field of the Invention

The present invention relates to a liquid crystal display, and more particularly to a liquid crystal display capable of providing a high contrast ratio using a monochromatic light source.

B) Description of the Related Art

A super-twisted nematic (STN)—liquid crystal display (LCD) has been used as a liquid crystal display unit of a high duty ratio. One type of STN-LCD is a blue color mode display device. A so-called blue color display, in which blue color is presented when a voltage is not applied and white color is presented when a voltage is applied, can be made by disposing a polarizing axis of an analyzer at 30 degrees in a counter-clockwise direction relative to long axes of liquid crystal molecules on an optical output side and by disposing a polarizing axis of a polarizer at 30 degrees in a clockwise direction relative to long axes of liquid crystal molecules on an optical input side, for the polarizing plates disposed above and under the liquid crystal cell.

JP-A-2004-62021 proposes to improve light shielding performance in a cut-off state by making liquid crystal composition of STN-LCD of the blue color mode contain dichromatic pigment. As another means for improving light shielding performance, there is a method of using a compensation plate.

STN-LCD of the blue color mode generally uses a white color back light. If a monochromatic light source such as a light emitting diode (LED) is used, it is possible to provide a mode in which a back light color becomes a display color in a normally black state, by lowering a minimum value of transmission factor in the absence of applied voltage at a wavelength of emission peak of the back light and making the back light transmit at its wavelength of peak emission in the presence of applied voltage.

SUMMARY OF THE INVENTION

STN-LCD has a transmission factor spectrum having a minimum value at some wavelength. In the mode of monochromatic display in a normally black state, it is desired to increase a contrast ratio of the presence of applied voltage to the absence of applied voltage.

An object of this invention is to provide an STN liquid crystal display unit capable of improving a contrast ratio in a normally black mode.

According to one aspect of the present invention, there is provided an STN liquid crystal display comprising: a back light using a monochromatic light source for emitting monochromatic light; and a liquid crystal display cell including opposing first and second transparent substrates, first and second transparent electrodes formed above opposing surfaces of the first and second transparent substrates, respectively, first and second alignment films formed above the first and second transparent substrates respectively, covering the first and second transparent electrodes, a liquid crystal layer containing chiral agent and squeezed between said first and second transparent substrates, and first and second polarizers disposed outside the first and second transparent substrates, respectively, wherein a twist angle of liquid crystal molecules of the liquid crystal layer is 155° to 210° and a first angle between a polarizing axis direction of the first polarizer and an alignment direction of liquid crystal molecules of the liquid crystal layer in contact with the first transparent substrate, and a second angle between a polarizing axis direction of the second polarizer and an alignment direction of liquid crystal molecules of the liquid crystal layer in contact with the second transparent substrate, are each larger than 0° and smaller than 90°, and a sum of the first and second angles is 90°±7°.

It is possible to provide STN-LCD of a normally black mode having a high contrast ratio and monochromatic display with good characteristics of viewing angle.

DESCRIPTION OF THE PREFERRED EMBODIMENTS

Figure 1:
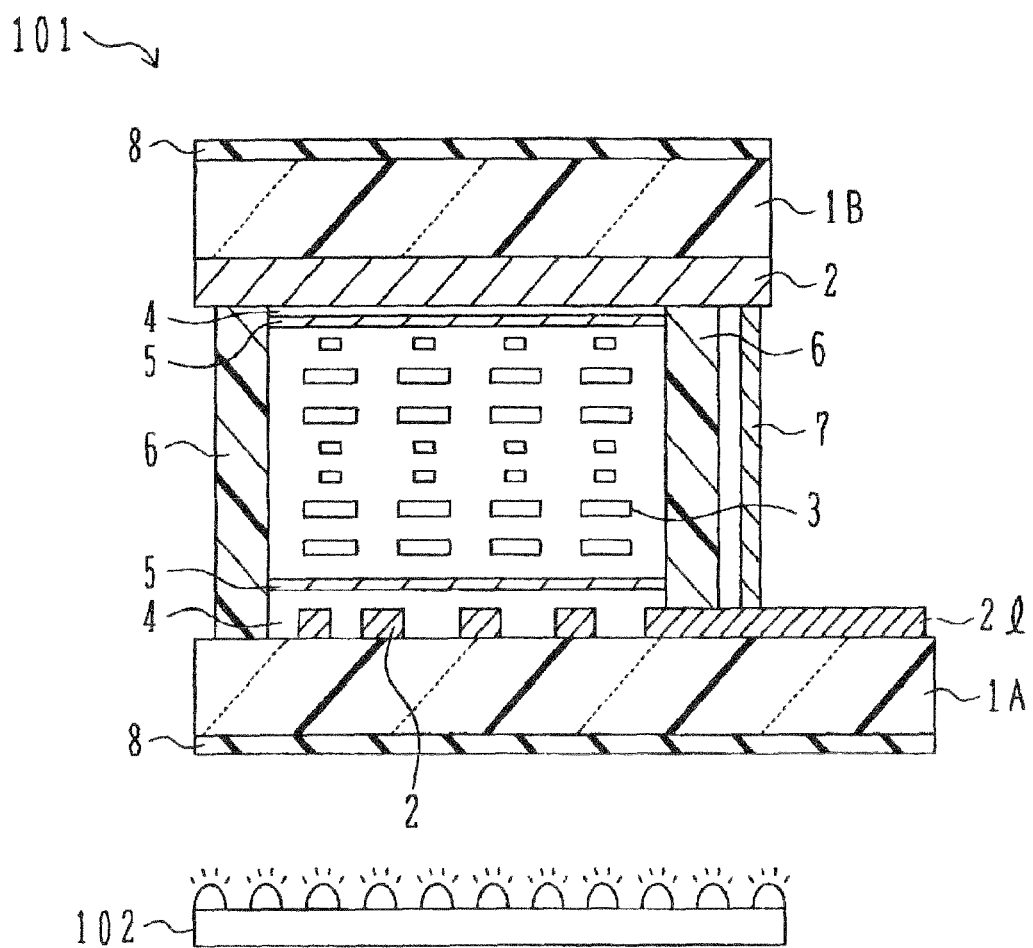
FIG. 1 is a schematic cross sectional view of a liquid crystal display.

FIG. 1 is a schematic cross sectional view of a liquid crystal display unit. The liquid crystal display has the liquid crystal display unit 101 and back light 102 as its main constituent components. The liquid crystal display unit 101 allows light from the back light 102 to be transmitted or shielded, to thereby display a pattern of an electrode 2.

Description will be made on a manufacture method for the liquid crystal display unit 101. A transparent ITO film is formed on each of two glass substrates 1A and 1B by CVD, vapor deposition, sputtering or the like and desired ITO electrode patterns 2 and external lead wirings 2 1 are formed by photolithography. An insulating film 4 is formed on each of the glass substrates having the ITO electrode patterns 2 and 2 1 by flexographic printing. Although this insulating film 4 is not essential it is preferable to form the insulating film in order to prevent a short circuit between the upper and lower substrates. The insulating film may be formed by vapor deposition, sputtering using a metal mask or the like, in addition to flexographic printing.

An alignment film 5 having the same pattern as that of the insulating film 4 is formed on the insulating film 4 by flexographic printing.

A rubbing process is executed for the alignment film 5. The rubbing process is a treatment of the alignment film 5 by rubbing with a tubular roll rotating at high speed wound with a cloth.

A seal material 6 having a predetermined pattern is formed on one substrate by screen printing. The seal material 6 may be formed by using a dispenser instead of screen printing. In this example, thermosetting seal material (product name ES-7500 manufactured by MITSUI CHEMICALS. INC) is used. Photosetting seal material or photo-thermo setting seal material may also be used. The seal material 6 contains several % of glass fibers of 6 μm in diameter.

A conductive material 7 is printed outside the seal material 6 at a predetermined position. In this example, the conductive material 7 made of the seal material ES-7500 containing several % of Au balls of 6.5 μm in diameter is formed at the predetermined position by screen printing.

The pattern of seal material 6 and pattern of conductive material 7 are formed above one of the substrates 1A and 1B, e.g., the upper substrate 1B, and a gap control member is sprayed on the other substrate, e.g., the lower substrate 1A by a dry spray method. The gap control material is made of plastic balls of 6 μm in diameter.

The two substrates 1A and 1B are stacked at the predetermined position, with the alignment films 5 being set inward, to form a cell and in a pressed state the seal material 6 is cured by heat treatment. A plurality of liquid crystal cells may be formed among a pair of substrates.

If a plurality of liquid crystal cells are formed among a pair of substrates, flaws are formed on the glass substrates with a scriber apparatus, and the substrates are divided into empty cells having a predetermined size and shape, by breaking.

Liquid crystal 3 containing chiral agent is injected into an empty cell by a vacuum injection method, and thereafter an injection port, is sealed with an end seal material. Thereafter, the glass substrates are chamfered and washed to form a liquid crystal cell.

A polarizer 8 is adhered to the top and bottom surfaces of the liquid crystal cell to complete a liquid crystal display unit 101 of the STN mode.

Description will be made on a blue color mode STN-LCD as a reference example.

Figure 2A:
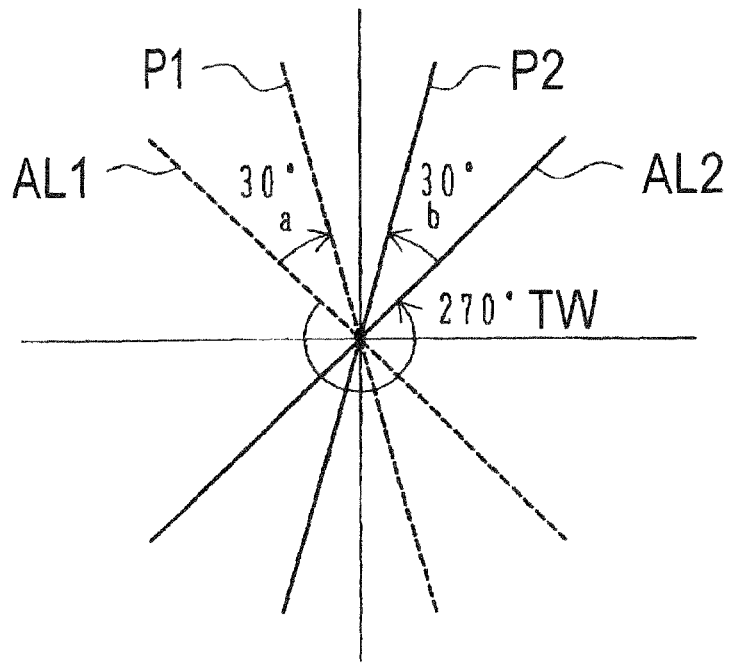
FIG. 2A is a schematic plan view of a blue color mode STN-LCD.

FIG. 2A is a diagram showing a relation between alignment directions of liquid crystal molecules and polarizing axis directions of the polarizers of a blue color mode STN-LCD. A horizontal direction and a vertical direction correspond to a horizontal direction and a vertical direction in a standard state of observing a liquid crystal display. As shown, a twist angle TW of liquid crystal is 270°. A smaller angle a of two angles between an alignment direction AL1 of liquid crystal molecules contacting an upper substrate (front substrate) and a polarizing axis direction P1 of an upper polarizer is 30°, and a smaller angle b of two angles between an alignment direction AL2 of liquid crystal molecules contacting a lower substrate (back substrate) and a polarizing axis direction P2 of a lower polarizer is also 30°.

Figure 2B:
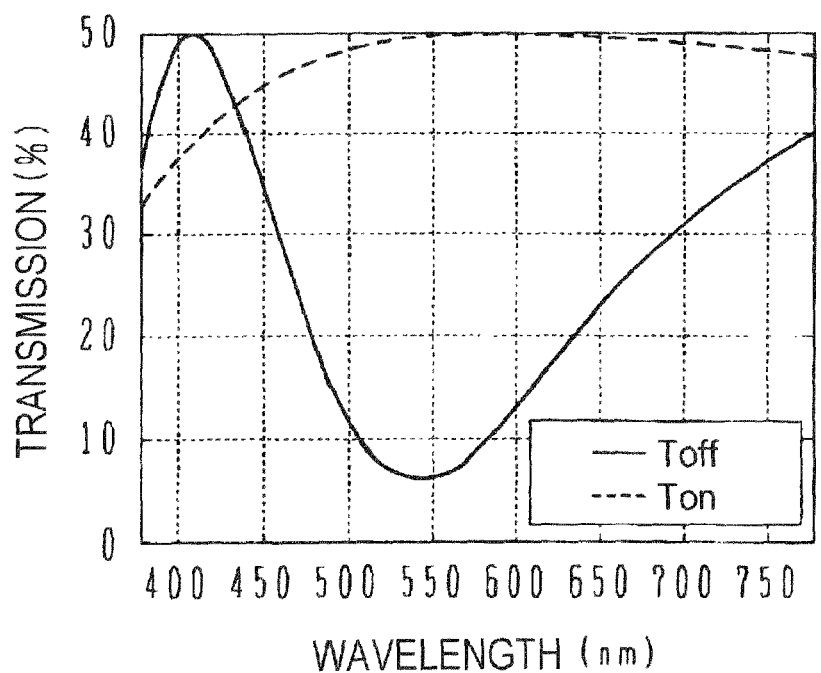
FIG. 2B shows transmission factor spectra of the liquid crystal display unit in generally a visible wavelength range.

FIG. 2B is a graph showing transmission factor spectra in a wavelength range including a visible wavelength range of the STN liquid crystal display shown in FIG. 2A The transmission factor was calculated by simulation software formed by the present inventor. As shown, a transmission factor spectrum in the absence of applied voltage has a maximum value and a minimum value in the visible wavelength range. The maximum value is at a wavelength of blue color, and is about 50%. A background color of the liquid crystal display in the absence of applied voltage becomes blue. A transmission factor in the presence of applied voltage is about 50% almost in the whole visible wavelength range. Although the transmission factor in the blue color wavelength range is slightly lower than that in the other visible wavelength range, light from a white color back light is transmitted to present white color display. Display is therefore preformed in white and blue colors.

A minimum value of the transmission factor in the absence of applied voltage is about 6% at a wavelength of 540 μm. Since the transmission factor is not 0% even at the minimum value, optical through occurs in the absence of applied voltage. In the display with a monochromatic light source, a transmission factor in the presence of applied voltage is about 48% and a transmission factor in the absence of applied voltage is about 6%, respectively at a wavelength of 540 nm at which a transmission factor ratio of the presence of applied voltage to the absence of applied voltage is highest. Therefore, a contrast ratio is about 8 at a maximum, and it is difficult to obtain a high contrast ratio.

The present inventor has paid attention to the minimum value of a transmission factor in the absence of applied voltage. If a minimum value of a transmission factor in the absence of applied voltage can be set as near at 0% as possible when using as a back light a light source which emits chromatic color light having a wavelength at the minimum value, the chromatic color is shielded in the absence of applied voltage, and transmitted in the presence of applied voltage. It is therefore possible to manufacture a liquid crystal display of a normally black having a high contrast ratio.

Through studies of various layouts of polarizers, the present inventor has found that excellent characteristics can be exhibited in the layout having an angle of 90° as a sum of angles (smaller angles) between alignment directions of liquid crystal molecules contacting upper and lower substrates of a liquid crystal display and polarizing axis directions of polarizers in proximity to the substrates. It has been found that if this condition is satisfied, there exists a wavelength at which a transmission factor is nearly 0% in the transmission factor spectra il the absence of applied voltage.

Figure 3A:
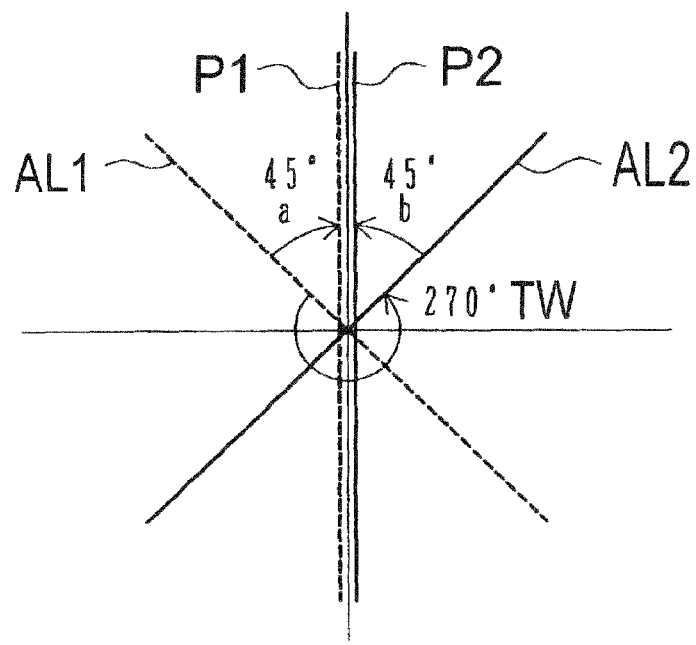
FIG. 3A is a schematic plan view of an STN-LCD.

Description will be made hereunder on examples assuming using as a back light a red light having a center of emission wavelength of 630 nm or a green light having a center of emission wavelength of 550 nm. A retardation of a cell is selected in such a maimer that a wavelength at a transmission factor of 0% or a wavelength taking a minimum value sufficiently small enough to realize normally black becomes coincident with a wavelength of the emission peak of a back light. A retardation of a cell can be adjusted by changing a cell thickness or a birefringence of a liquid crystal layer. The birefringence can be adjusted as desired by changing liquid crystal material or mixing liquid crystal materials having different characteristics, in the allowable range normally used as the material of a liquid crystal display unit FIG. 3A is a schematic plan view of an STN-LCD, showing a relation between alignment directions of liquid crystal molecules and polarizing axis directions of the polarizers of STN-LCD. As shown, a twist angle TW of liquid crystal is 270° A smaller angle a of two angles between an alignment direction AL1 of liquid crystal molecules contacting an upper substrate and a polarizing axis direction P1 of an upper polarizer is 45°, and a smaller angle b of two angles between an in-plane alignment direction AL2 of liquid crystal molecules contacting a lower substrate and a polarizing axis direction P2 of a lower polarizer is 45°.

Figure 3B:
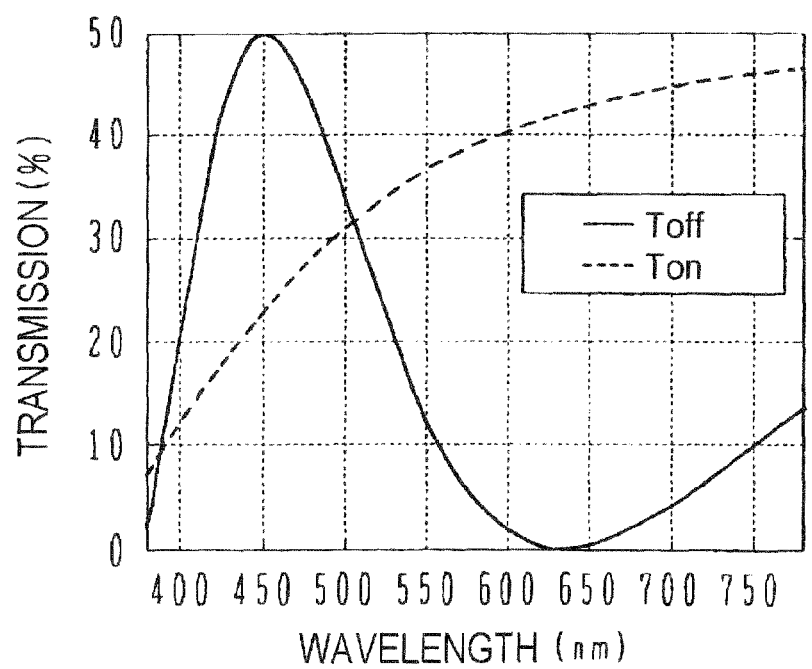
FIG. 3B shows transmission factor spectra of the liquid crystal display unit in generally a visible wavelength range.

FIG. 3B is a graph showing transmission factor spectra generally in a visible wavelength range of the liquid crystal display shown in FIG. 3A. As shown, a transmission factor spectrum in the absence of applied voltage has a minimum value of 0% at a wavelength of 630 nm. By using an LED at this wavelength as a back light, light from the back light can be shielded in the absence of applied voltage so that normally black can be realized. A transmission factor in the presence of applied voltage is about 42% at a wavelength of 630 nm so that a high contrast ratio can be realized.

A retardation of the liquid crystal cell is 847 nm.

An angle a+b is not necessarily required to be 90°. The present inventor has studied a preferable angle a+b.

Figure 4:
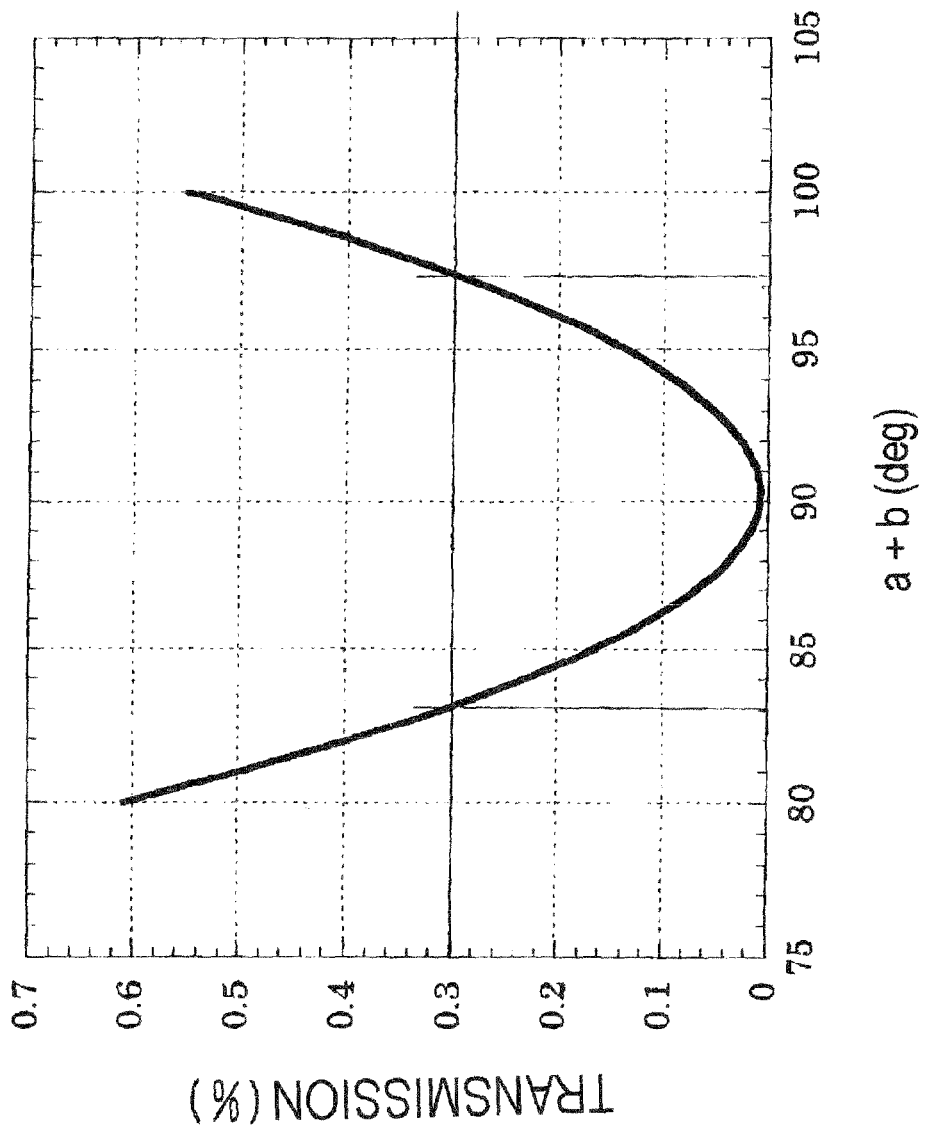
FIG. 4 shows characteristics of the transmission factor versus angle of a liquid crystal display unit at a wavelength of 630 nm.

FIG. 4 is a graph showing a transmission factor relative to an angle a+b of a liquid crystal display unit at a wavelength of 630 nm in the absence of applied voltage. Various samples having different polarizer polarizing angles were manufactured, and displays were observed. It has been found that a sample having a minimum value of transmission factor of not larger than 0.3% in the absence of applied voltage is suitable for a liquid crystal display unit. In order to satisfy this condition, it can be seen from the graph that it is sufficient if the angle a+b is 90°±7° (first condition).

An STN-LCD manufactured under the first condition has a high contrast ratio when viewed from the front side. The inventor has studied the condition of obtaining good display also in the case in which the viewing angle is moved up/down and right/left, because the characteristics of viewing angle particularly along the right/left directions are important for applications to vehicle mount.

Figure 5A:
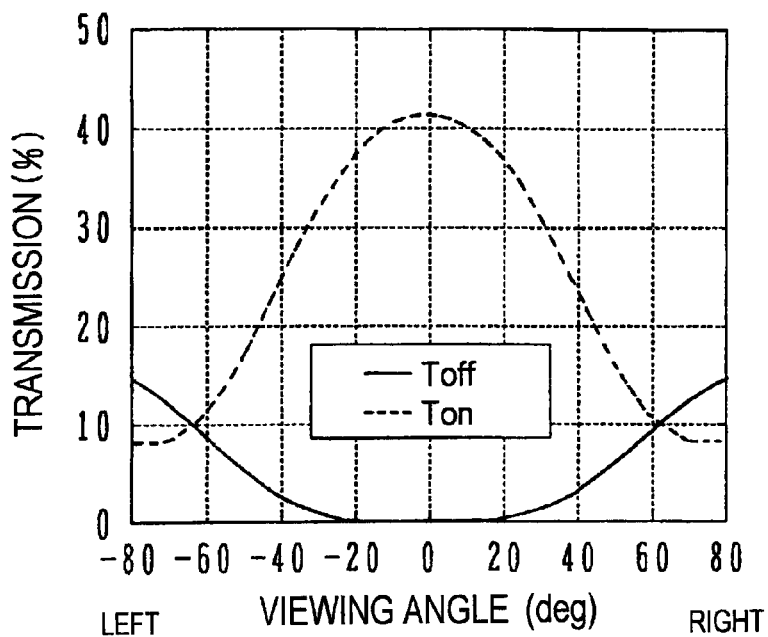
FIG. 5A shows characteristics of the transmission factor versus right/left viewing angle of the 270° STN-LCD shown in FIG. 3A at a wavelength of 630 nm.

FIG. 5A shows the characteristics of transmission factor versus viewing angle in the right/left directions of the 270° STN-LCD shown in FIG. 3A at a wavelength of 630 nm. The abscissa represents an angle using the positive direction as the right direction viewed from the front side. As shown, as the right/left angles become large, difference of a transmission factor between the absence and presence of applied voltage reduces and a contrast ratio lowers. Transmission factors of the absence and presence of applied voltage are reversed at right/left angles larger than about 60°.

Figure 5B:
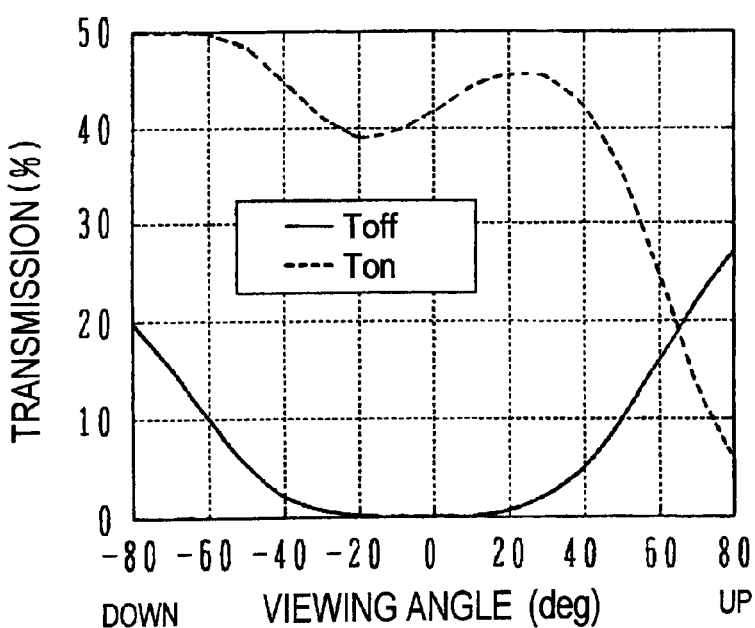
FIG. 5B shows characteristics of the transmission factor versus up/down viewing angle of the 270° STN-LCD shown in FIG. 3A at a wavelength of 630 nm.

FIG. 5B shows characteristics of the transmission factor versus viewing angle in the up/down directions of the 270° STN-LCD shown in FIG. 3A at a wavelength of 630 nm. The abscissa represents an angle using the positive direction as the up direction viewed from the front side. As shown, a transmission factor in the presence of applied voltage is asymmetrical relative to the viewing angle in the up/down directions. A transmission factor in the absence of applied voltage is generally symmetrical lip to about a viewing angle of about 30° relative to the up/down directions, and has a sufficient light shield ability.

The light shield ability takes an important role in a contrast ratio of LCD. In the embodiment, the better it is that a minimum value of the transmission factor in the absence of applied voltage is as near to 0% as possible. The present inventor has paid attention to a transmission factor in the absence of applied voltage, and has studied the transmission factor spectra generally in the visible wavelength range by using a viewing angle as a parameter.

Figure 6:
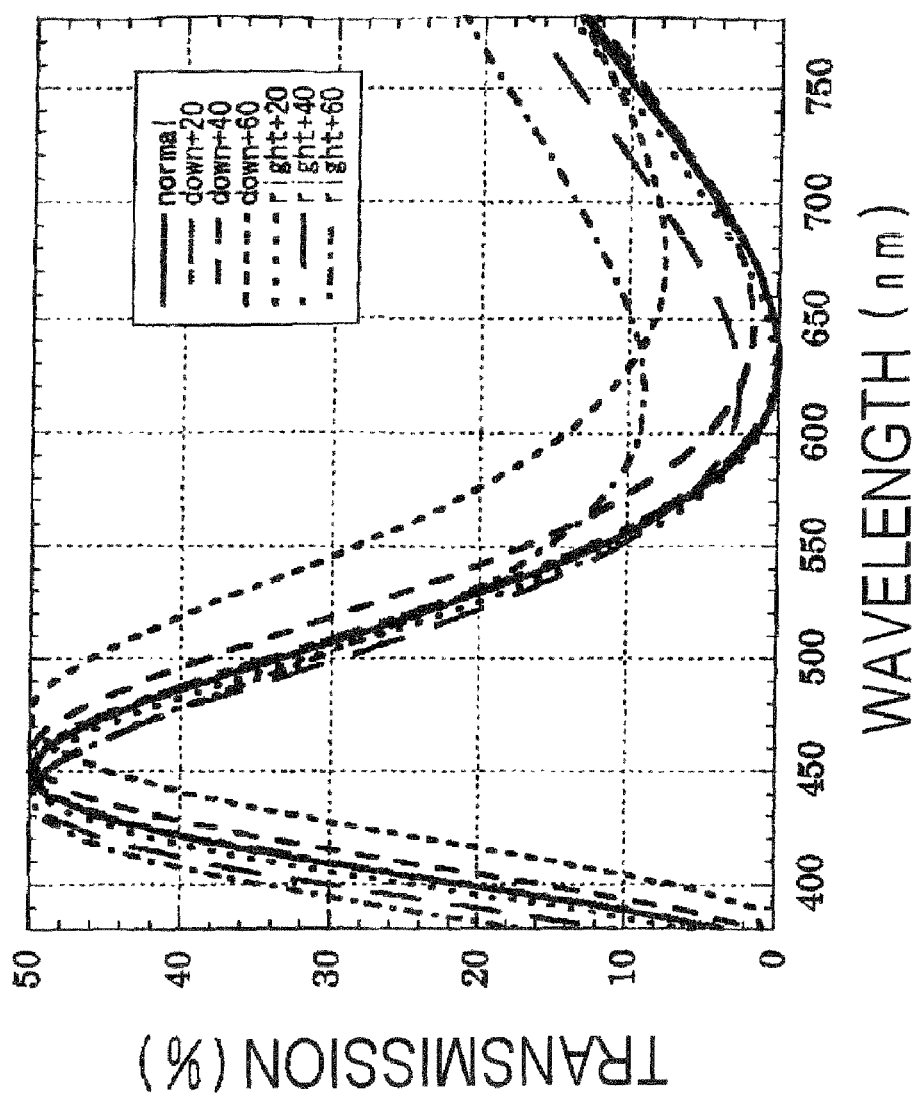
FIG. 6 shows the transmission factor spectra of the 270° STN-LCD shown in FIG. 3A in the absence of applied voltage and generally in the visible wavelength range.

FIG. 6 shows the transmission factor spectra generally in the visible wavelength range and in the absence of applied voltage of the 270° STN-LCD shown in FIG. 3A. The transmission factor spectra shown in FIG. 6 are obtained by moving a viewing angle along the right/left directions relative to the front side, by using as a parameter a viewing angle at a pitch of 20° up to 60°. In FIG. 6, "normal" corresponds to 0°.

As shown, at a viewing angle of 20°, the transmission factor spectra in both the right/down directions do not have a large difference from the transmission factor spectrum at the viewing angle of 0°. As the viewing angle is moved largely to 40° or to 60°, the transmission factor spectrum is gradually shifted. A minimum value of the transmission factor is about 2% at a viewing angle of 40°, and about 8 to 9% at a viewing angle of 60°, and as the liquid crystal display is viewed at these angles, optical through occurs.

Description will be made on the transmission factor spectra when the viewing angle is moved along the left/up directions not shown in FIG. 6. The transmission factor spectra when the viewing angle is moved along the left direction are considered to be almost similar to those when the viewing angle is moved along the right direction from the results shown in FIG. 5A. The transmission factor spectra when the viewing angle is moved along the up direction are considered to be almost similar to those when the viewing angle is moved along the down direction, at least up to a view angle of about 30°, from the results shown in FIG. 5B. The transmission factor spectra when the viewing angle is moved down not lower than 30° may be different from those when the viewing angle is moved in the down direction or almost symmetrical (depending upon a pretilt angle of the crystal layer).

The present inventor has studied how the characteristics of transmission factor versus viewing angle in the absence of applied voltage change with a twist angle of the liquid crystal layer. During the studies the characteristics of transmission factor versus viewing angle have also been studied not only for STN-LCD but also for 90°-twist TN-LCD.

Figure 7A:
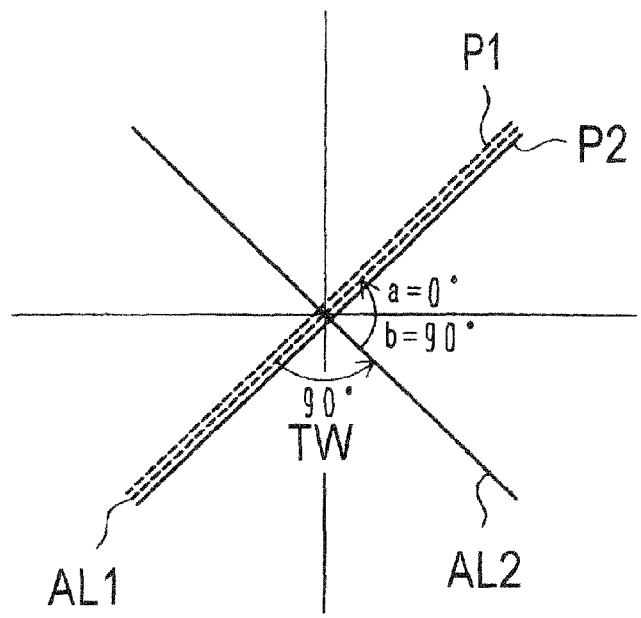
FIG. 7A is a schematic plan view of a 90° TN-LCD.

FIG. 7A is a schematic plan view of 90° TN-LCD, and shows liquid crystal molecule alignment directions and polarizer polarizing axis directions on both sides of upper and lower substrates. Liquid crystal molecules of 90° TN-LCD shown in FIG. 7A are twisted by 90° and the polarizing axes of the upper and lower polarizer are parallel.

Figure 7B:
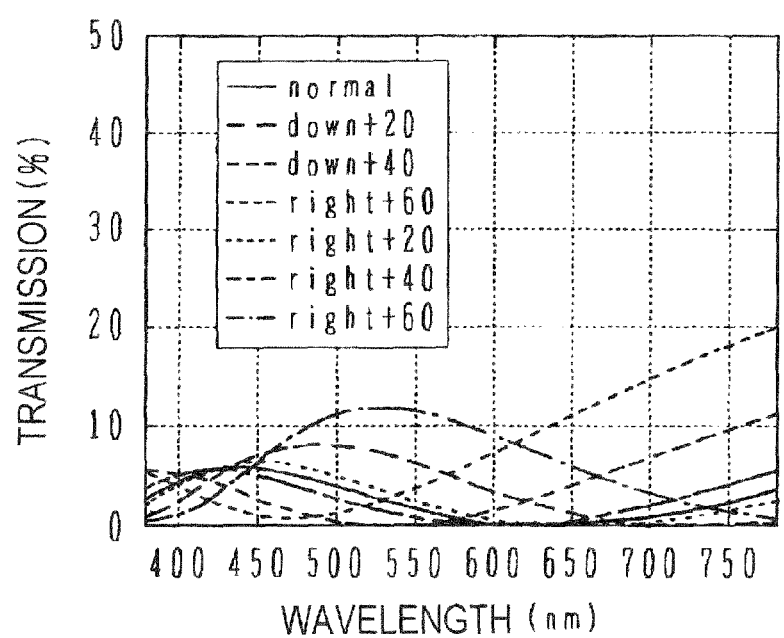
FIG. 7B shows the transmission factor spectra of the 90° TN-LCD in the absence of applied voltage and generally in the visible wavelength range.

FIG. 7B shows the transmission factor spectra of 90° TN-LCD generally in the visible wavelength range and in the absence of applied voltage. The factors and parameter shown in FIG. 7B are similar to those shown in FIG. 6. In the example shown in FIGS. 7A and 7B, red color display in black color background is realized as viewed from the front side (viewing angle of 0°), wherein the polarizers are disposed in the polarizing axis directions shown in FIG. 7A relative to the TN cell having a twist angle of 90° and a retardation of about 0.555 μm and a red color light having a emission peak at 630 nm is used as a back light.

As shown in FIG. 7B, however, the transmission factor spectrum shifts largely as the viewing angle is moved by 40° or 60°. A transmission factor in the absence of applied voltage at a wavelength of 630 nm is about 2% at a viewing angle of 40°, and about 8% at a viewing angle of 60°. It is therefore difficult to realize good characteristics of viewing angle.

Figure 8:
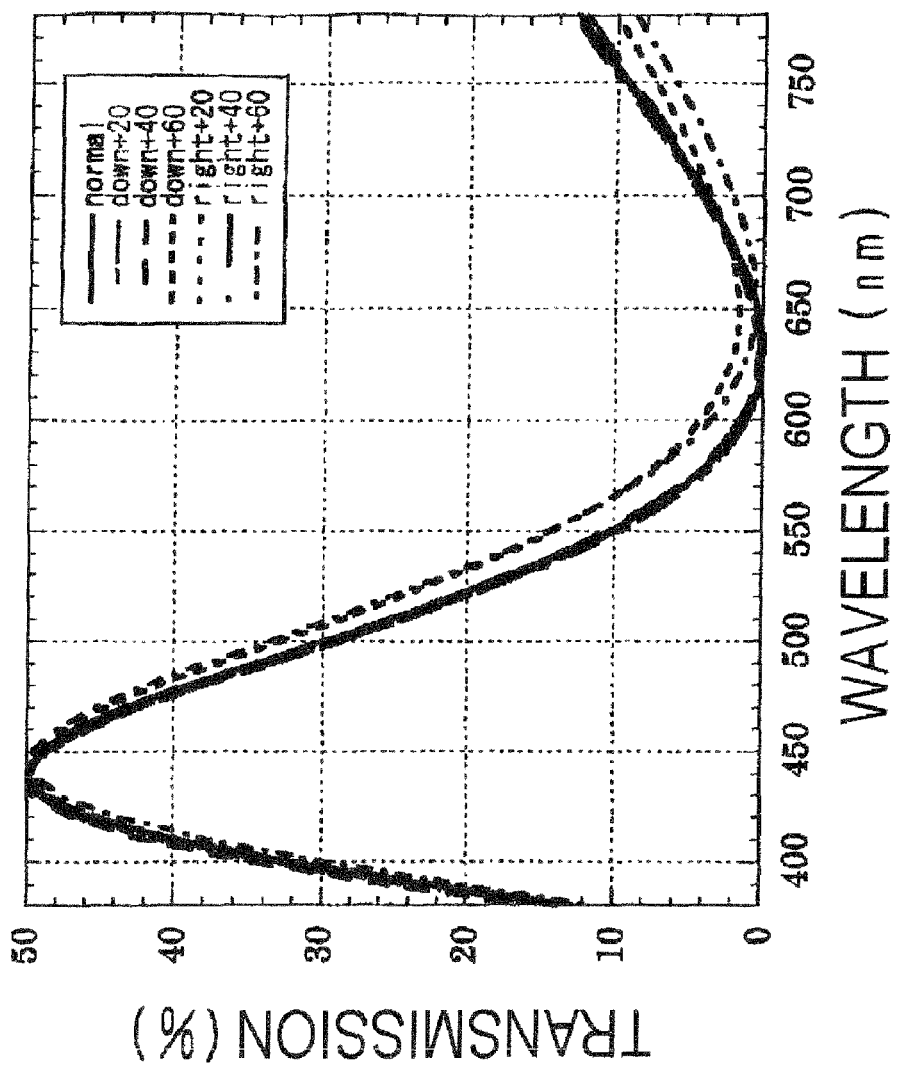
FIG. 8 shows the transmission factor spectra of the 180° TN-LCD in the absence of applied voltage and generally in the visible wavelength range.

FIG. 8 shows the transmission factor spectra of 180° STN-LCD generally in the visible wavelength range and in the absence of applied voltage. A retardation of the liquid crystal cell is 0.847 μm. As shown, in the case of 180°-twist, a shift of the transmission factor spectrum is small at a viewing angle of 40°, and a minimum value is maintained generally at 0%.

The present inventor has studied a preferable twist angle of STN-LCD by considering from the above results that there exists an optimum range of the characteristics of transmission factor versus viewing angle in the absence of applied voltage and a twist angle of the liquid crystal layer.

Figure 9:
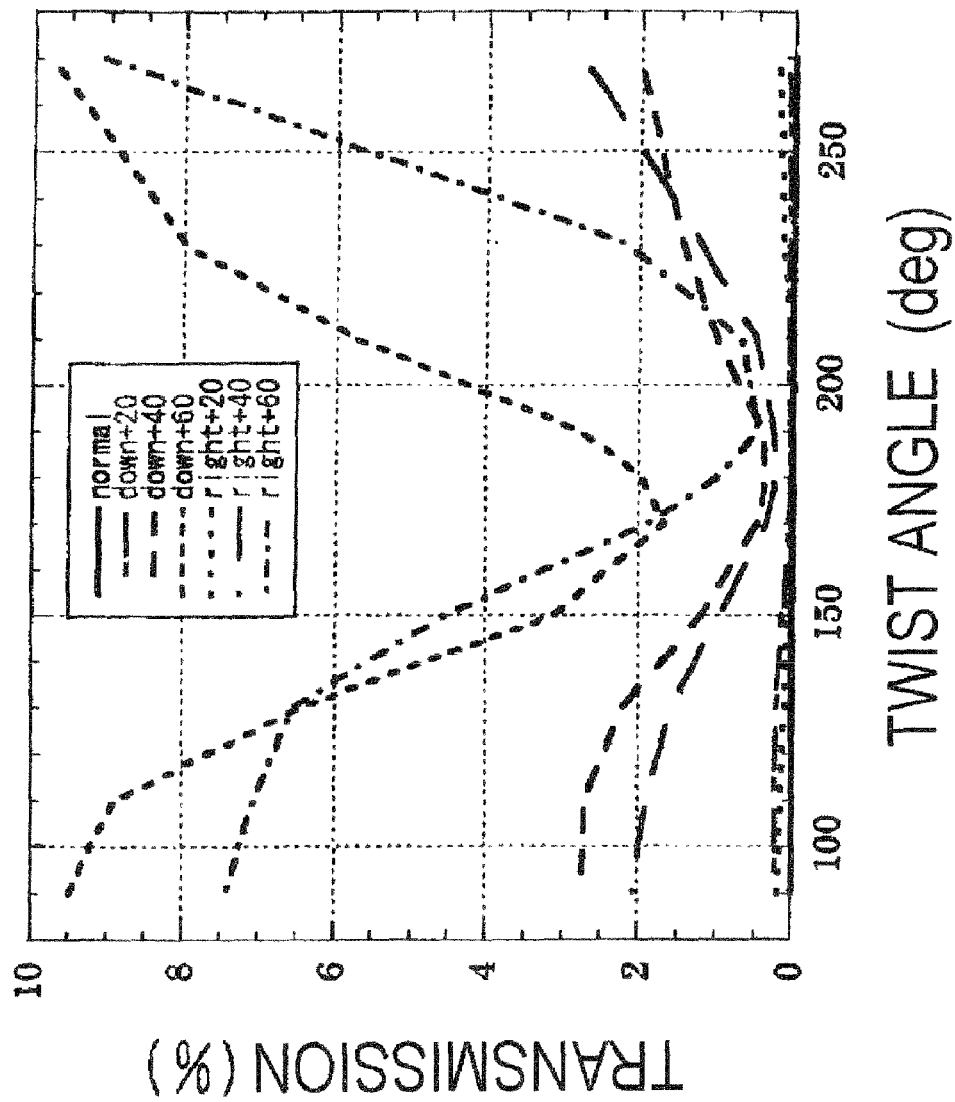
FIG. 9 shows characteristics of the transmission factor versus twist angle of an STN-LCD at a wavelength of 630 nm, using a viewing angle as a parameter.

FIG. 9 shows the characteristics of transmission factor versus twist angle of STN-CLD at a wavelength of 630 nm by using a viewing angle as a parameter.

In order to realize display having wide characteristics of viewing angle, it is preferable to realize a low transmission factor in the absence of applied voltage at a viewing angle not higher than 40° in both the down/right directions. Display devices manufactured under various conditions were observed. It has been found that display is good if a minimum of transmission factor lower than 1% is realized within the viewing angle range of 40°. In FIG. 9, a twist angle is 155° to 210° at a minimum of transmission factor lower than 1% and at the viewing angle of 40° in the down/right directions (second condition).

The present inventor has limited further a preferable twist angle. Since characteristics of viewing angle in the right/left directions are considered important for a vehicle mount display, it is desired that a minimum of transmission factor in the absence of applied voltage is as small as possible in the viewing angle range of 40° in the right/left directions. Display devices manufactured under various conditions from this viewpoint were observed. It has been found that characteristics of viewing angle of a vehicle mount display device are improved further if a minimum of transmission factor is not higher than 0.3% in the viewing angle range of 40° in the right/left directions. In FIG. 9 a twist angle is 170° to 200° at a minimum transmission factor not higher than 0.3% and at the viewing angle of 40° in the right/left directions (in FIG. 9, in the right direction. As already described, characteristics of viewing angle in the right/left directions are expected to be generally symmetrical).

Description will be made on a liquid crystal display unit satisfying the first and second conditions and a red color light as a back light at a wavelength of 630 nm of emission peak with a liquid crystal cell.

First Embodiment

Figure 10A:
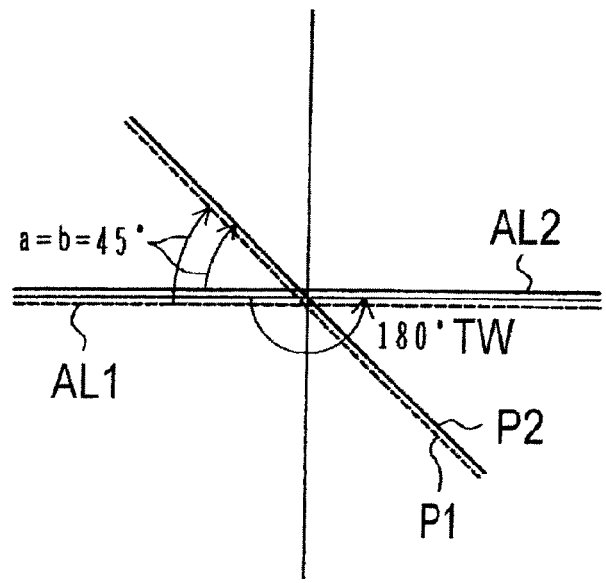
FIG. 10A is a schematic plan view of an STN-LCD.

FIG. 10A is a schematic plan view of STN-LCD, and shows liquid crystal molecule alignment directions and polarizer polarizing axis directions on both sides of upper and lower substrates. As shown, a liquid crystal twist angle is 180°. A smaller angle a of two angles between an alignment direction AL1 of liquid crystal molecules contacting an upper substrate and a polarizing axis direction P1 of an upper polarizer is 45°, and a smaller angle b of two angles between an alignment direction AL2 of liquid crystal molecules contacting a lower substrate and a polarizing axis direction P2 of a lower polarizer is also 45°. A retardation of the liquid crystal cell is 713 nm.

Figure 10B:
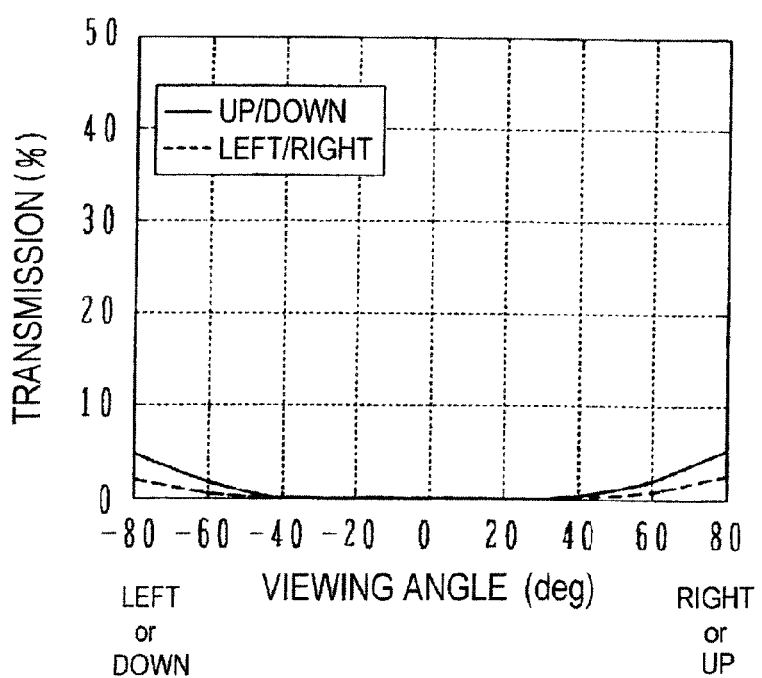
FIG. 10B shows characteristics of the transmission factor versus viewing angle of the liquid crystal display unit at a wavelength of 630 nm.

FIG. 10B shows the characteristics of transmission factor versus viewing angle of the liquid crystal display unit at a wavelength of 630 nm. As shown, a minimum of transmission factor is maintained not higher than 1% within the viewing angle range of 40° both in the up/down directions and right/left directions. It is also known that a minimum of transmission factor is maintained not higher than 1% within the viewing angle range of 60° both in the right/left directions, providing good characteristics of viewing angle.

Second Embodiment

Another embodiment will be described using a red color light of a wavelength of emission peak of 630 nm as a back light with a liquid crystal cell.

Figure 11A:
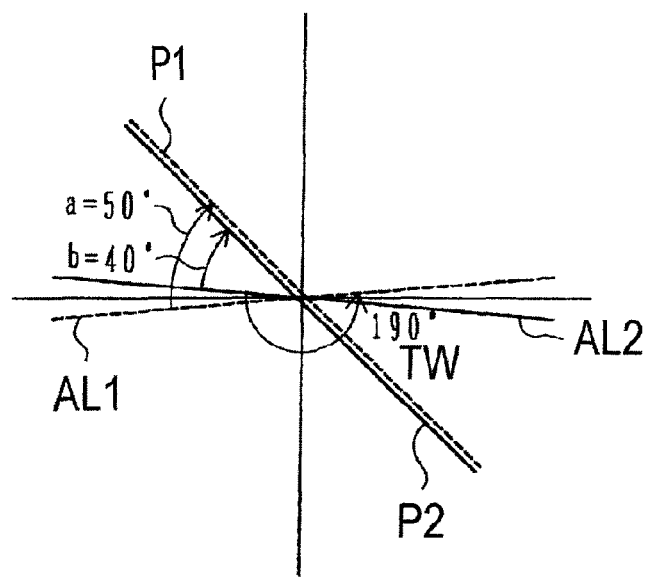
FIG. 11A is a schematic plan view of an STN-LCD.

FIG. 11A is a schematic plan view of STN-LCD, and shows liquid crystal molecule alignment directions and polarizer polarizing axis directions on both sides of upper and lower substrates. As shown, a liquid crystal twist angle is 190°. A smaller angle a of two angles between an alignment direction AL1 of liquid crystal molecules contacting an upper substrate and a polarizing axis direction P1 of an upper polarizer is 50°, and a smaller angle b of two angles between an alignment direction AL2 of liquid crystal molecules contacting a lower substrate and a polarizing axis direction P2 of a lower polarizer is also 40°.

Figure 11B:
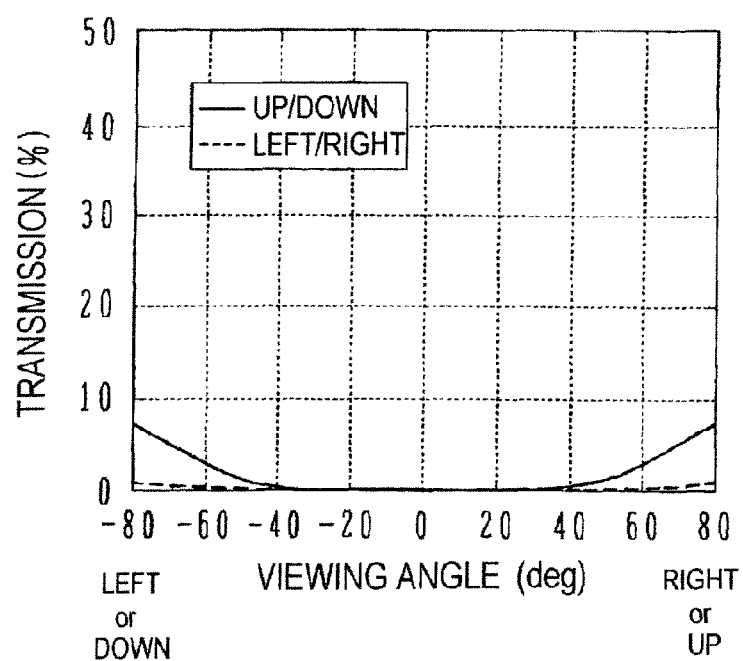
FIG. 11B shows characteristics of the transmission factor versus viewing angle of the liquid crystal display unit at a wavelength of 630 nm.

FIG. 11B shows the characteristics of transmission factor versus viewing angle of the liquid crystal display unit at a wavelength of 630 nm. As shown, a good minimum of transmission factor is maintained within the viewing angle range of 40° both in the up/down directions and right/left directions.

It is also known that a minimum of transmission factor is maintained not higher than 1% within the viewing angle range of 80° both in the right/left directions, providing good characteristics of viewing angle.

Third Embodiment

Another embodiment will be described using a green color light of a wavelength of emission peak of 550 nm as a back light with a liquid crystal cell. A combination of liquid crystal molecule alignment directions and polarizer polarizing axis directions of STN-LCD and a liquid crystal twist angle are similar to those of the second embodiment. By setting a cell retardation to 0.614 µm, it was adjusted in such a manner that a minimum value of a transmission factor in the absence of applied voltage appeared at a wavelength of 550 nm.

Figure 12:
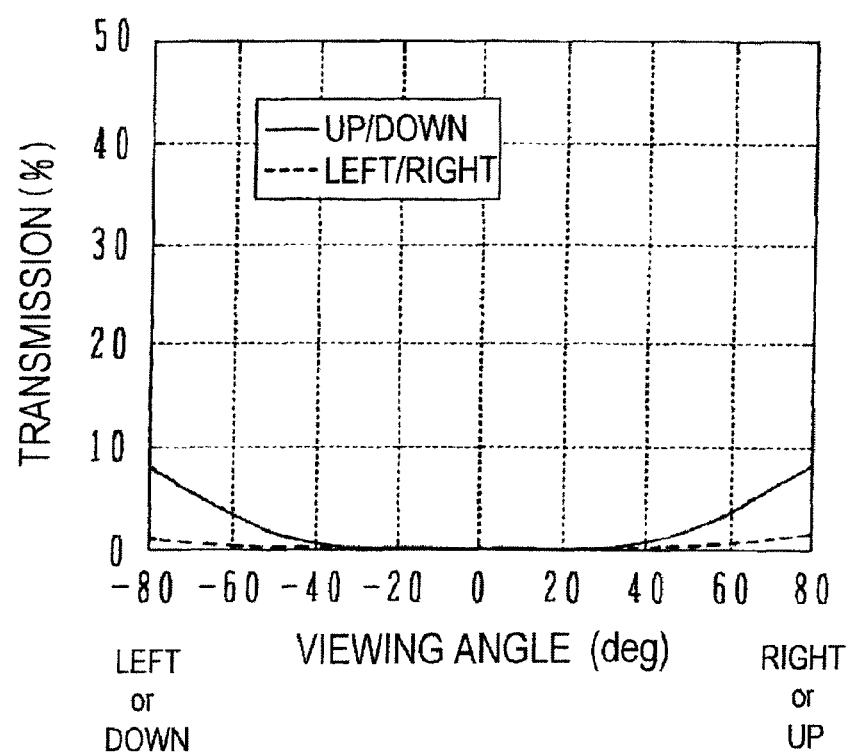
FIG. 12 shows characteristics of the transmission factor versus viewing angle of a liquid crystal display unit at a wavelength of 550 nm.

FIG. 12 shows the characteristics of transmission factor versus viewing angle of the liquid crystal display unit at a wavelength of 550 nm. As shown, a good minimum value of transmission factor is maintained within the viewing angle range of 40° both in the up/down directions and right/left directions. It is also known that a minimum value of transmission factor is maintained not higher than 1% within the viewing angle range of about 75° both in the right/left directions, providing good characteristics of viewing angle.

A light source having a different emission peak may be used as the back light if the following conditions are satisfied.

(1) An STN type liquid crystal display unit is used having a twist angle of a liquid crystal layer of 155° to 210°.

(2) The liquid crystal molecule alignment directions of the liquid crystal layer and the polarizer polarizing axis directions are not the same, and a sum of the upper substrate side angle (angle a) and the lower substrate side angle (angle b) regarding the smaller angles between the alignment direction and polarizing direction is 90°±7°.

(3) A retardation of the cell can be adjusted in such a manner that a wavelength at which a minimum value of transmission factor in the absence of applied voltage takes a minimum value exists in the emission wavelength range of the back light.

Figure 13:
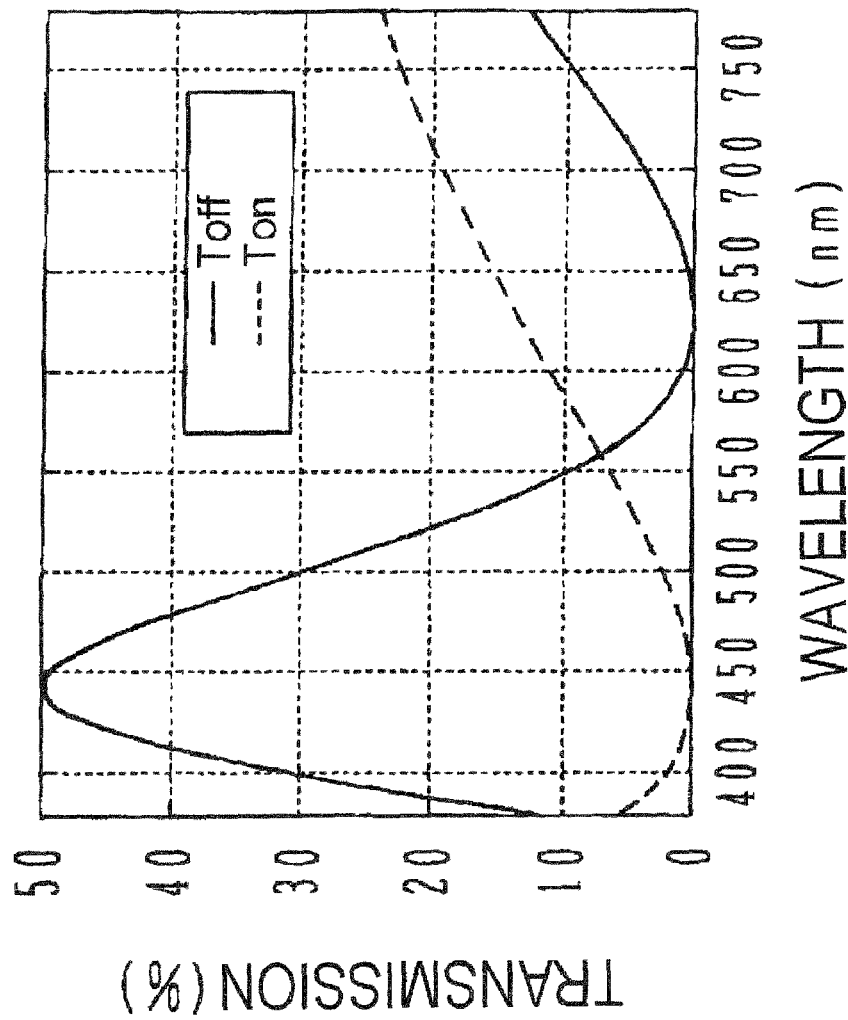
FIG. 13 shows the transmission factor spectra in the absence/presence of applied voltage.

FIG. 13 shows the transmission factor spectra in the absence of applied voltage and in the presence of applied voltage of the first embodiment. A minimum value of transmission factor in the absence of applied voltage is almost 0% at a wavelength of 630 nm, realizing a high contrast ratio. A transmission factor in the presence of applied voltage is as low as about 14%. If this value can be made high a liquid crystal display unit having better performance can be provided.

The present inventor has studied a condition (third condition) for increasing a transmission factor in the presence of applied voltages in addition to the first and second conditions.

Figure 14:
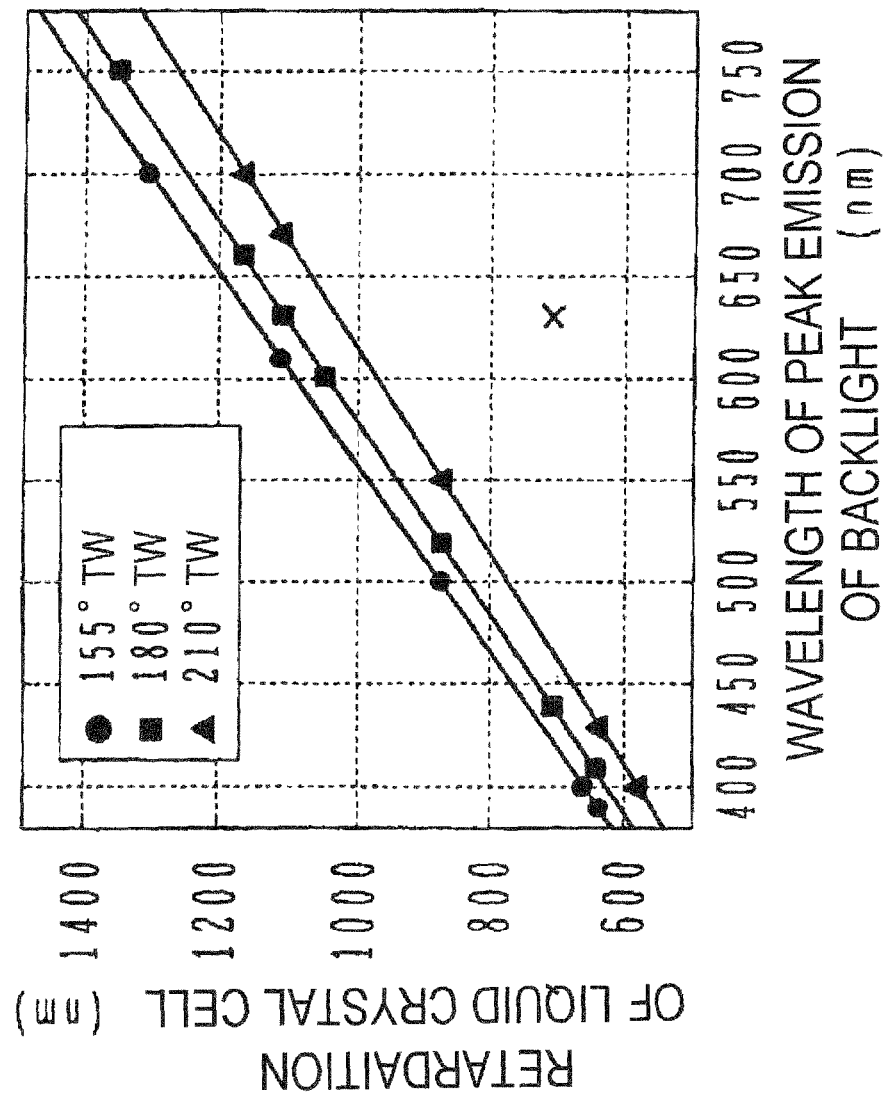
FIG. 14 shows a range of an optimum retardation relative to a wavelength of emission peak of the back light.

FIG. 14 shows an optimum retardation range relative to a wavelength of emission peak. Three straight lines in FIG. 14 obtained by plotting optimum retardations providing a high transmission factor in the presence of applied voltage at each of liquid crystal twist angles of 155°, 180° and 210° and interconnecting plots by three straight lines. The optimum retardation is intended to mean a retardation providing as high a transmission factor in the presence of applied voltage as possible in the range not hindering a liquid crystal cell operation as judged by the present inventor.

At the same wavelength, the optimum retardation is largest at the twist angle of 155°, and is smallest at the twist angle of 210°. Between these optimum retardations, there exists the optimum retardation at the twist angle of 180°. Also between these retardation straight lines, there exist the optimum retardations in a twist angle range of 155° to 210°.

From these results, the range of a retardation R satisfying the third condition is given by the following formula (1):

$$1.95\lambda - 200 \leq R \leq 2.13\lambda - 185 \quad (1)$$

where $\lambda$ is a wavelength of emission peak of a back light. This formula indicates a condition necessary for obtaining a high transmission factor in the presence of applied voltage near at the wavelength of emission peak of the back light.

A retardation of the liquid crystal display unit of the first embodiment is indicated by a cross symbol (×) in FIG. 14.

The inventor has tried to derive a formula generalizing the formula (1) of $1.95\lambda - 200 \leq R \leq 2.13\lambda - 185$. It is assumed that a retardation function represented by a wavelength $\lambda$ function can be approximated to a formula (2).

$$R = f(T)\lambda + g(T) \quad (2)$$

by using temporary functions of a twist angle T(°):

$$f(T) = aT + b$$

$$g(T) = cT + d$$

The formula (1) is substituted into the retardation formulas (3) and (4) at the twist angles of 155° and 210°:

$$R = 2.13\lambda - 185 \quad (3)$$

$$R = 1.95\lambda - 200 \quad (4)$$

to form simultaneous equations (5-1) to (6-2):

$$f(155) = 155a + b = 2.13 \quad (5\text{-}1)$$

$$f(210) = 210a + b = 1.95 \quad (5\text{-}2)$$

$$f(155) = 155c + d = -185 \quad (6\text{-}1)$$

$$f(210) = 210c + d = -200 \quad (6\text{-}2)$$

These equations are solved to obtain:

$$R = (-0.00327T + 2.637)\lambda - 0.2727T - 142.7$$
$$(155 \leq T \leq 210) \quad (7)$$

This formula shows an optimum value of a retardation, and the value in the range of 90% to to 110% of the formula(7) is expected to be the condition (third condition) necessary for increasing a transmission factor in the presence of applied voltage.

Studies are made on the liquid crystal display unit having a twist angle of 180°, an angle a=45°, an angle b=45°, and a wavelength of emission peak of 630 nm of a single wavelength light source by considering the above-described three conditions In the foregoing, the plus/minus sign of an angle between a liquid crystal molecule alignment direction and a polarizer polarizing axis direction is not considered. In the following, however, the plus/minus sign of an angle is incorporated in the studies. The upper substrate side angle of the smaller angle relative to the polarizer polarizing direction is represented by an angle c, and the lower substrate side angle is represented by an angle d (|c|=a, |d|=b). This is because the plus/minus sign of the angle influences a retardation of a liquid crystal cell. An angle has a plus sign for the counterclockwise direction from the liquid crystal molecule alignment direction toward the polarizer polarizing direction.

Figure 15A:
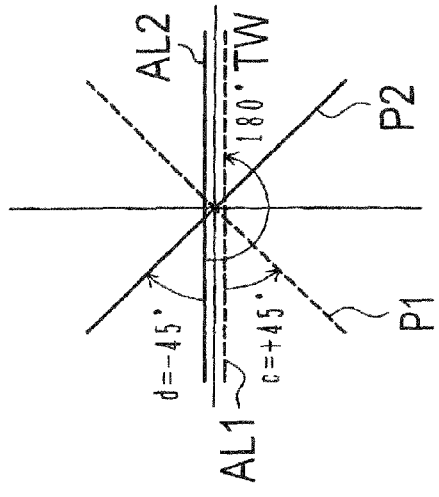
FIG. 15A to 15D show liquid crystal molecule alignment directions and polarizer polarizing axis directions of liquid crystal display units.
Figure 15B:
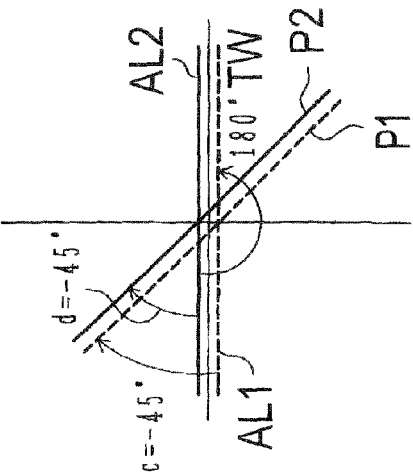
Figure 15C:
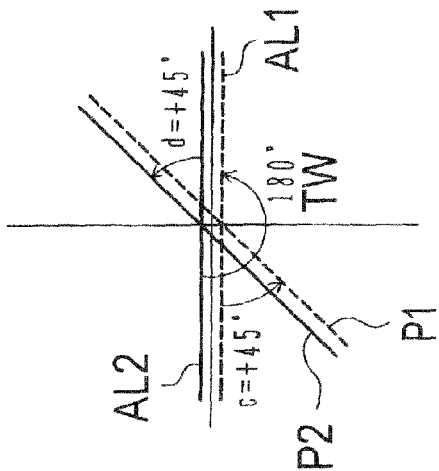
Figure 15D:
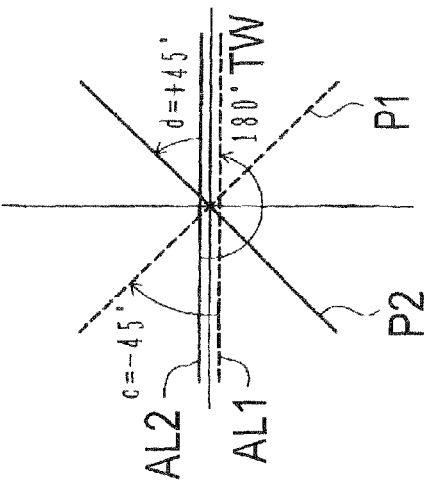

FIGS. 15A to 15D show liquid crystal molecule alignment directions and polarizer polarizing axis directions of liquid crystal display units (where FIG. 15A is equivalent to FIG. 15D). When considering the plus/minus sign of angles c and d, there are the following combinations (15-1) to (15-4) of angles (corresponding to FIGS. 15A to 15D):

$c=+45°, d=+45°$ (15-1)

$c=45°, d=-45°$ (15-2)

$c=-45°, d=+45°$ (15-3)

$c=-45°, d=-45°$ (15-4)

These four angle combinations satisfy the first and second conditions. Studies are made on whether a retardation of a liquid crystal cell satisfies the third condition.

Retardations of the combinations (15-1) and (15-4) are 713 nm which does not satisfy the third condition.

Retardations of the combinations (15-2) and (15-3) are 1110 nm which satisfies the third condition. These two combinations are adopted as the fourth embodiment.

In the fourth embodiment, the angles c and d are opposite.

Figure 16:
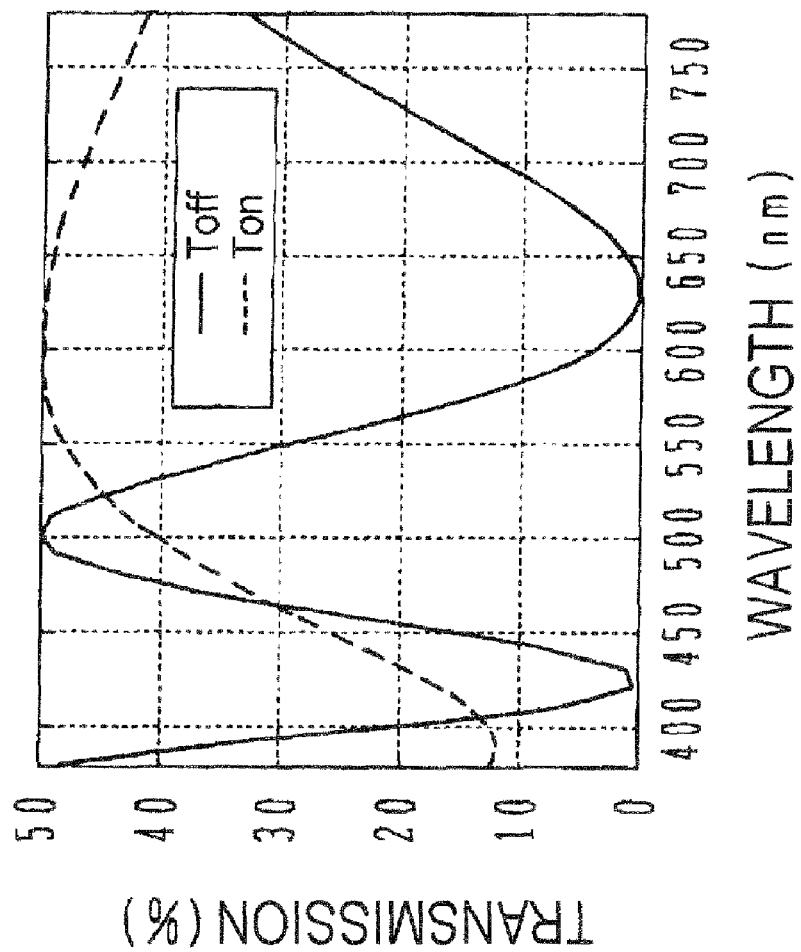
FIG. 16 shows transmission factors spectra according to a fourth embodiment.

FIG. 16 shows the transmission factor spectra of the fourth embodiment. As shown, a transmission factor spectrum in the absence of applied voltage has a minimum value of almost 0% at a wavelength of 630 nm. A transmission factor in the presence of applied voltage at the same wavelength has a high value of about 50%. It can therefore be said that a light shield performance in the absence of applied voltage is high and a contrast ratio is high.

Figure 17A:
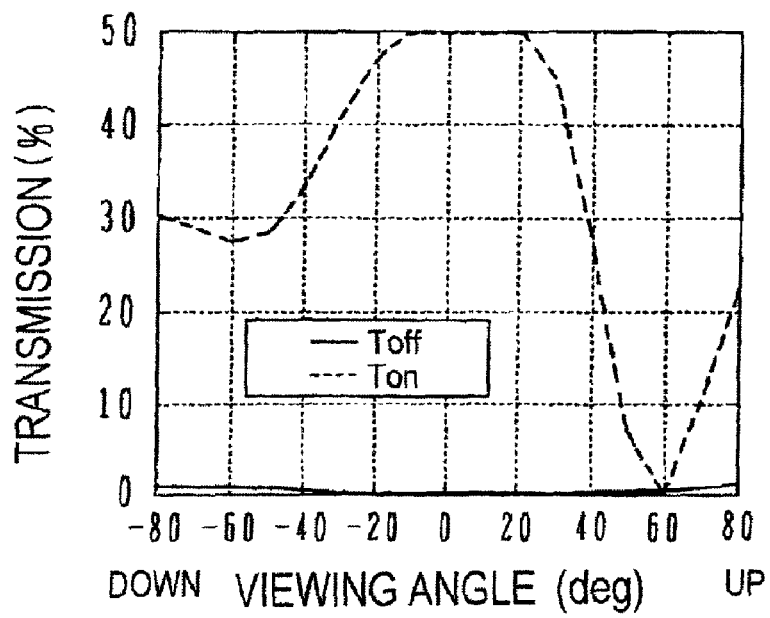
FIG. 17A shows characteristics of transmission factor versus viewing angle obtained by moving a viewing angle up/down.
Figure 17B:
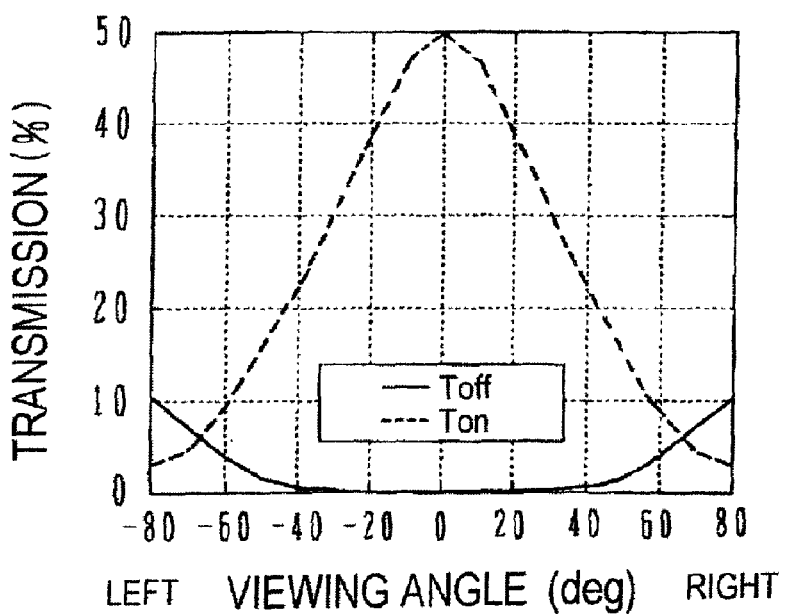
FIG. 17B shows characteristics of transmission factor versus viewing angle obtained by moving a viewing angle right/left.
Figure 18B:
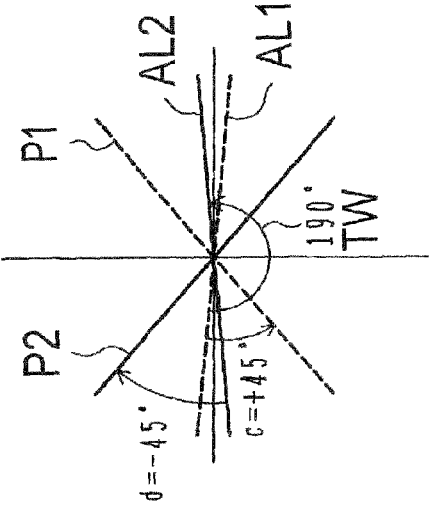
FIG. 18A to 18D show liquid crystal molecule alignment directions and polarizer polarizing axis directions of liquid crystal display units.
Figure 18D:
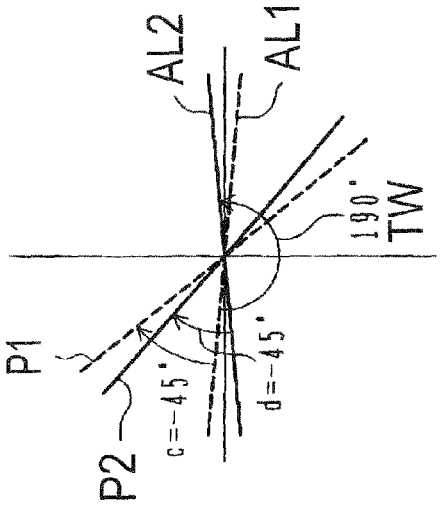
Figure 18A:
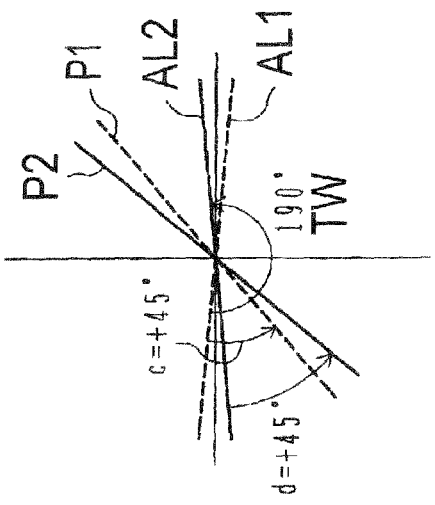
Figure 18C:
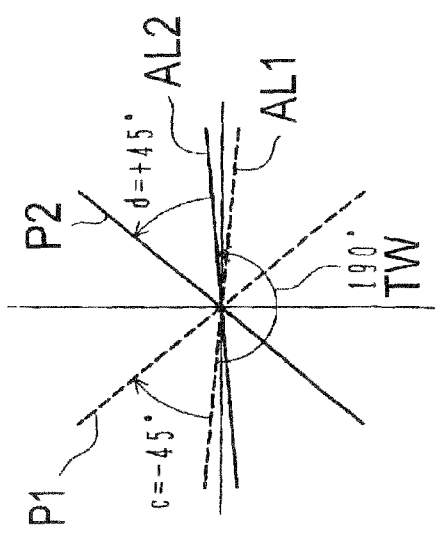

FIG. 17A shows transmission factor curves when a viewing angle is moved in the up/down directions, and FIG. 17B shows transmission factor curves when a viewing angle is moved in the right/left directions.

Reference is made to FIG. 17A. As the viewing angle is moved in the up/down directions a minimum value of transmission factor in the absence of applied voltage is maintained not higher than 1% (a minimum value of transmission factor at which characteristics of viewing angle are good in the second condition) in the viewing angle range of −40° to 40°. A transmission factor in the presence of applied voltage is not lower than 30% in the viewing angle range of −40° to 40°, and symmetry is not so bad. It can therefore be said from these results that characteristics of viewing angle in the up/down directions are good. Reference is made to FIG. 17B. As the viewing angle is moved in the right/left directions, a minimum value of transmission factor in the absence of applied voltage is generally symmetrical in the right/left directions and maintained not higher than 2% in the viewing angle range of −50° to 50°. A transmission factor in the presence of applied voltage is almost symmetrical in the viewing angle range of −80° to 80°. It can therefore be said from these results that characteristics of viewing angle in the right/left directions are also good.

As the third condition is satisfied in addition to the first and second conditions, it is possible to provide a liquid crystal display unit having a good light shield performance in the absence of applied voltage, good characteristics of viewing angle, and a high contrast ratio.

Combinations of various angles providing an angle a+b=90° have been studied, and it has been found that a transmission factor in the presence of applied voltage becomes highest at the combination of a=b=45°.

Studies are made on a liquid crystal display unit having a twist angle of 190°, an angle a=45°, an angle b=45°, and an emission peak wavelength of 630 nm of a single wavelength light source.

FIGS. 18A to 18D show liquid crystal molecule alignment directions and polarizer polarizing axis directions of liquid crystal display units. Similar to the fourth embodiment, when considering the plus/minus sign of angles c and d, there are the following combinations (18-1) to (18-4) of angles (corresponding to FIGS. 18A to 18D):

$c=+45°, d=+45°$ (18-1)

$c=-45°, d=-45°$ (18-2)

$c=-45°, d=+45°$ (18-3)

$c=-45°, d=-45°$ (18-4)

These four angle combinations satisfy the first and second conditions. Studies are made on whether a retardation of a liquid crystal cell satisfies the third condition.

Retardations of the combinations (18-1) and (18-4) are 683 nm which does not satisfy the third condition.

Retardations of the combinations (18-2) and (18-3) are 1086 nm which satisfies the third condition. These two combinations are adopted as the fifth embodiment.

Similar to the fourth embodiment, also in the fifth embodiment, the angles c and d are opposite.

Figure 19:
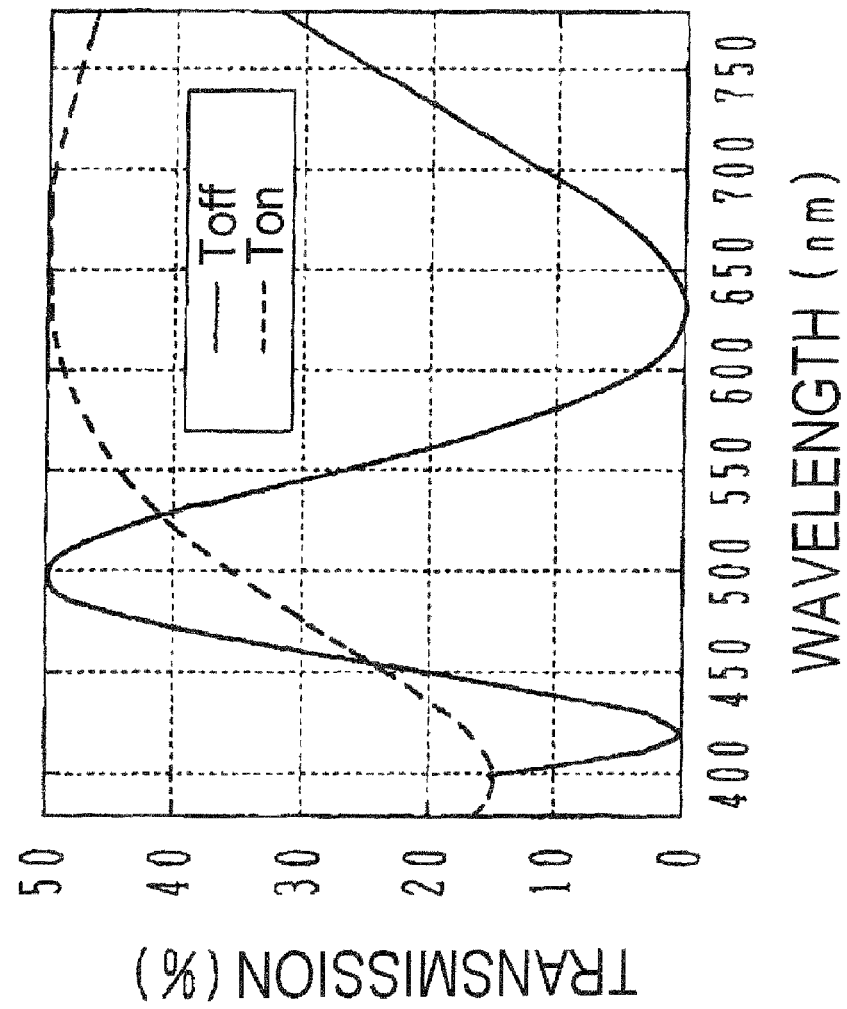
FIG. 19 shows transmission factors spectra according to a fifth embodiment.

FIG. 19 shows the transmission factor spectra of the fifth embodiment. As shown a transmission factor spectrum in the absence of applied voltage has a minimum value of almost 0% at a wavelength of 630 nm. A transmission factor in the presence of applied voltage at the same wavelength has a high value of about 49%. It can therefore be said that a light shield performance in the absence of applied voltage is high and a contrast ratio is high.

Figure 20A:
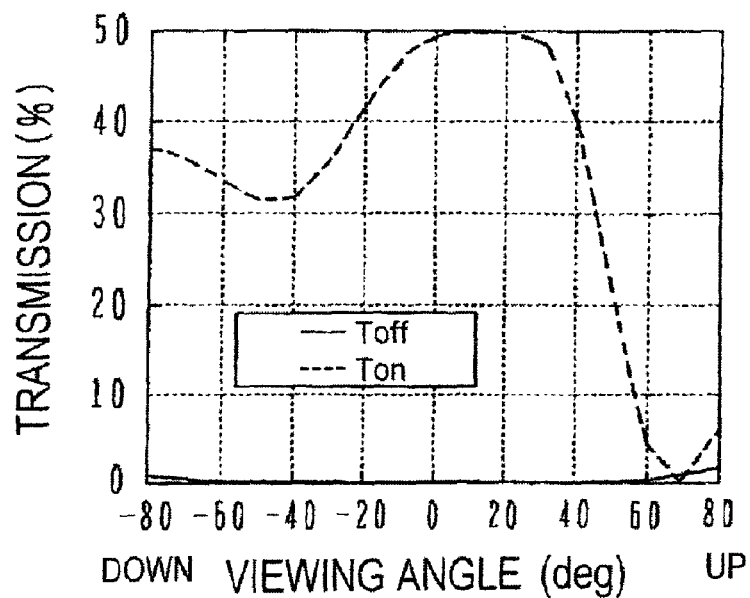
FIG. 20A shows characteristics of transmission factor versus viewing angle obtained by moving a viewing angle up/down.
Figure 20B:
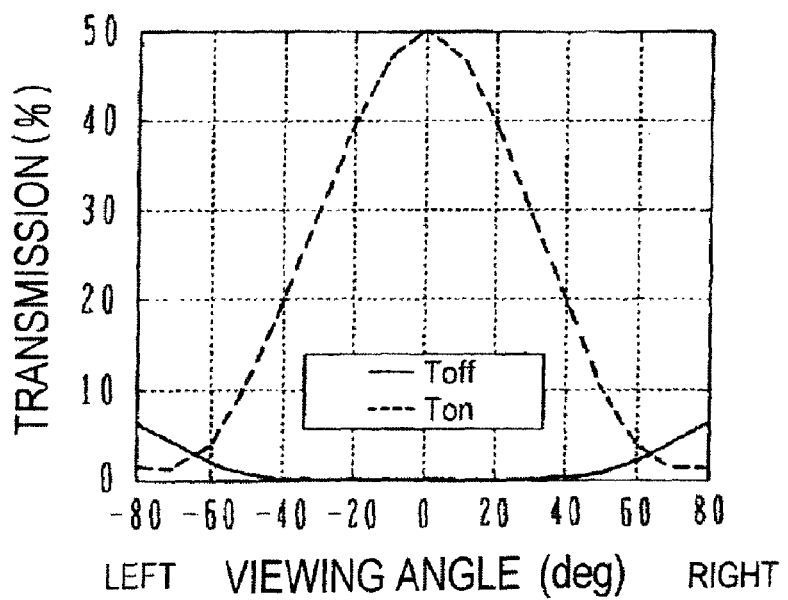
FIG. 20B shows characteristics of transmission factor versus viewing angle obtained by moving a viewing angle right/left.

FIG. 20A shows transmission factor curves when a viewing angle is moved in the up/down directions, and FIG. 20B shows transmission factor curves when a viewing angle is moved in the right/left directions.

Reference is made to FIG. 20A. As the viewing angle is moved in the up/down directions, a minimum value of transmission factor in the absence of applied voltage is maintained at 1% in the viewing angle range of −80° to 70°. Although a transmission factor in the presence of applied voltage is slightly shifted from symmetry, it is maintained not lower than about 32% in the viewing angle range of −40° to 40°. It can therefore be said from these results that the characteristics of viewing angle in the up/down directions are good.

Reference is made to FIG. 20B. As the viewing angle is moved in the right/left directions, a minimum value of transmission factor in the absence of applied voltage is generally symmetrical in the right/left directions and maintained not higher than 1% in the viewing angle range of −50° to 50°. A transmission factor in the presence of applied voltage is almost symmetrical in the viewing angle range of −80° to 80°. It can therefore be said from these results that the characteristics of viewing angle in the right/left directions are also good.

A wavelength of emission peak of a monochromatic light source is not limited to 630 nm. Description will be made on a liquid crystal display unit using a single wavelength light source having an emission peak at a wavelength of 550 nm according to the sixth embodiment.

The sixth embodiment has a liquid crystal cell structure and a combination of the angles c and d similar to those of the fifth embodiment and has a different retardation. A retardation of the cell is set to 917 nm so as to make a minimum value of a transmission factor in the absence of applied voltage be coincide with an emission peak wavelength 550 nm.

Figure 21:
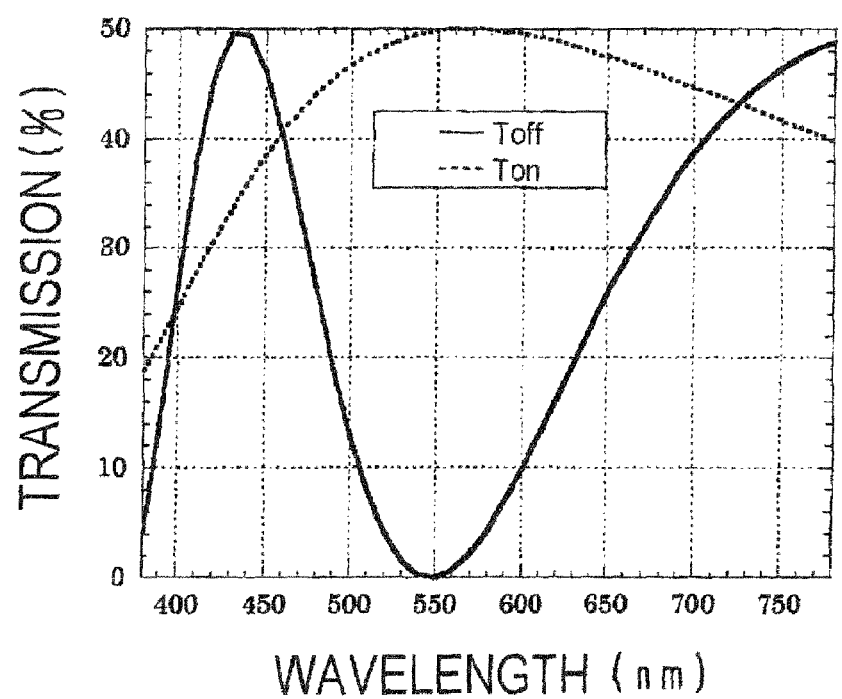
FIG. 21 shows transmission factor spectra according to a sixth embodiment.

FIG. 21 shows transmission factor spectra of the sixth embodiment. As shown, a transmission factor spectrum in the absence of applied voltage has a minimum value of almost 0% at a wavelength of 550 nm. A transmission factor in the presence of applied voltage at the same wavelength has a high value of about 50%. It can therefore be said that a light shield performance in the absence of applied voltage is high and a contrast ratio is high.

The embodiments described above are expected to be applied to a liquid crystal display part of a multiplex drive method having a select voltage applying part, a non-select voltage applying part and a no-voltage applying unit provided in the liquid crystal cell. In this case, it is preferable that a liquid crystal alignment state in the select voltage applying part is made to be coincident with a liquid crystal alignment state in the non-select voltage applying part as much as possible, for high contrast and low cross talk.

Figure 22A:
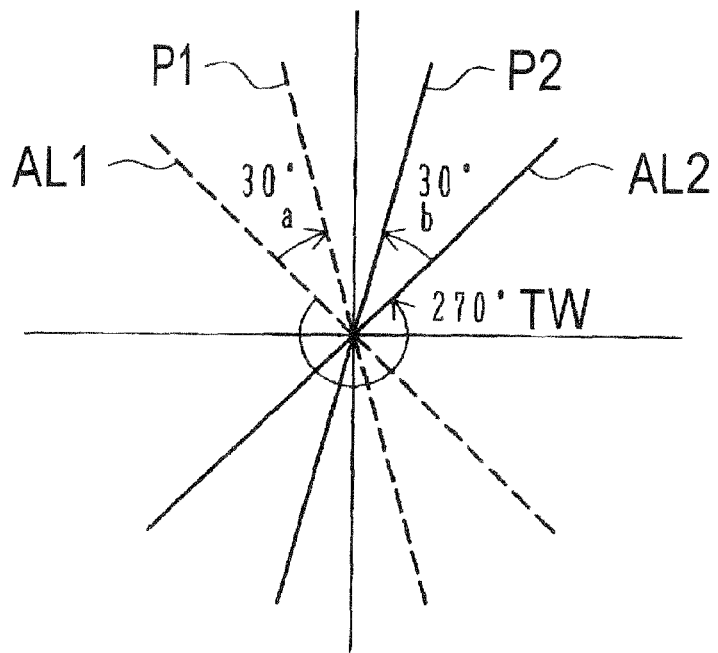
FIG. 22A is a diagram showing the relation between an in-plane alignment direction of liquid crystal molecules and a polarizer polarizing axis direction on an STN-LCD of a comparative example.

FIG. 22A is a diagram showing a relation between in-plane alignment directions of liquid crystal molecules and polarizer polarizing axis directions of STN-LCD according to a comparative example. As shown, a liquid crystal twist angle TW is 270°. A smaller angle a of two angles between an alignment direction AL1 of liquid crystal molecules contacting an upper substrate and a polarizing axis direction P1 of an upper polarizer is 30°, and a smaller angle b of two angles between an alignment direction AL2 of liquid crystal molecules contacting a lower substrate and a polarizing axis direction P2 of a lower polarizer is 30°. A retardation R of the liquid crystal cell of the comparative example is 0.952 μm.

Figure 22B:
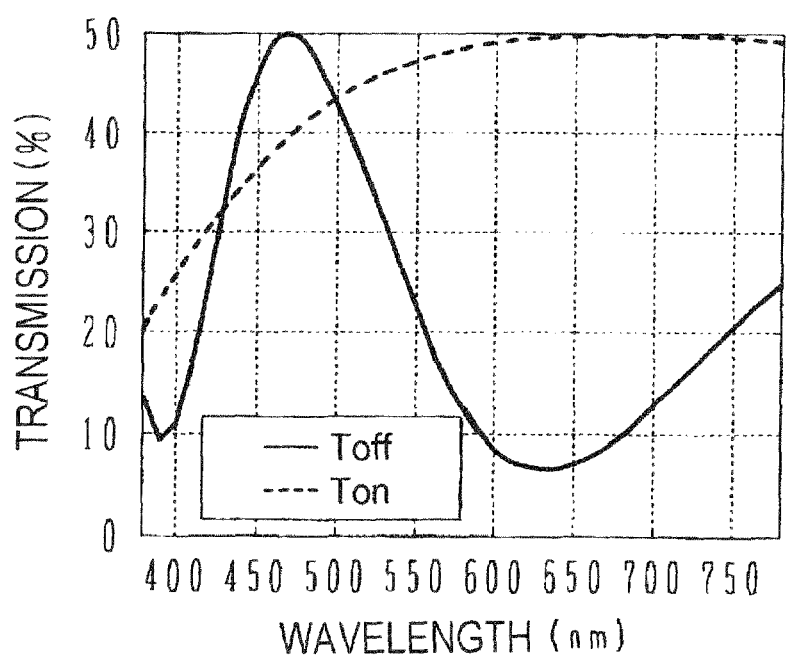
FIG. 22B shows transmission factor spectra in a wavelength range of the liquid crystal display unit shown in FIG. 22A, including a visible wavelength range.

FIG. 22B shows transmission factor spectra in the wavelength range including the visible wavelength range of the liquid crystal display shown in FIG. 22A. As shown, a transmission factor Toff in the absence of applied voltage has a minimum value of about 6% at a wavelength of 630 nm. Even if LED at this wavelength is used as a back light, a portion of light of the back light in the absence of applied voltage transmits so that normally black cannot be realized. A transmission factor Ton in the presence of applied voltage is about 50% at a wavelength of 630 nm, and a contrast ratio is about 8.

Figures 23A, 23B:
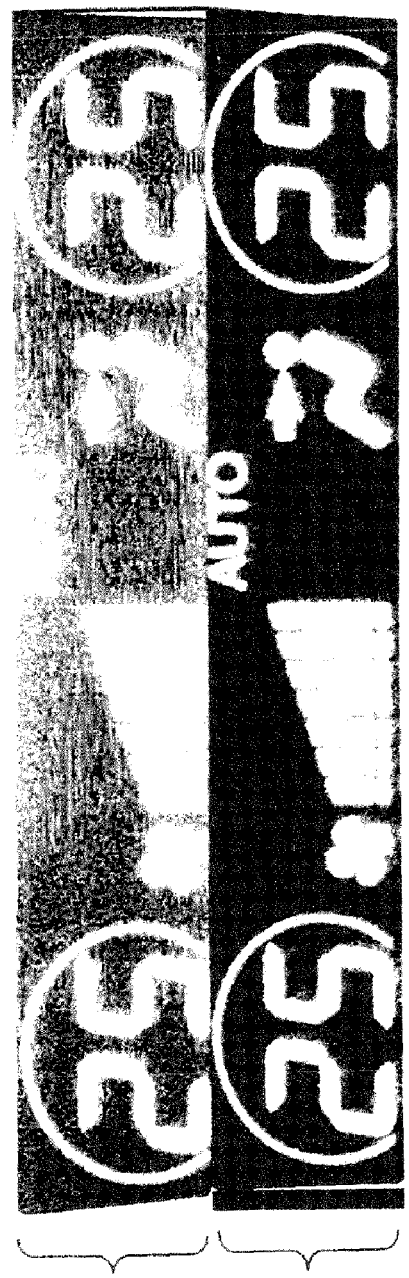
FIG. 23A shows a display example of a liquid crystal display unit adopting the comparative embodiment.
FIG. 23B is a display example of a liquid crystal display unit adopting the first embodiment.

FIGS. 23A and 23B show examples of a vehicle mount liquid crystal displays Many vehicle mount liquid crystal displays are of a simple matrix type, a segment type, or a single matrix+segment type. For example, red display of a normally black mode is used for display of a vehicle mount air conditioner.

FIG. 23A shows a display example of the liquid crystal display adopting the comparative example, and FIG. 23B shows a display example of the liquid crystal display adopting the first embodiment. It can be seen that a display example of the liquid crystal display adopting the first embodiment has a higher contrast ratio with black background.

The present invention has been described in connection with the preferred embodiments. The invention is not limited only to the above embodiments. For example, as a monochromatic light source, a laser may be used instead of LED.

It will be apparent to those skilled in the art that other various modifications, improvements, combinations and the like can be made.

What are claimed are:

1. An STN liquid crystal display comprising:
   a back light using a monochromatic light source for emitting monochromatic light; and
   a liquid crystal display cell including opposing first and second transparent substrates, first and second transparent electrodes formed above opposing surfaces of the first and second transparent substrates, respectively, first and second alignment films formed above the first and second transparent substrates, respectively, covering the first and second transparent electrodes, a liquid crystal layer containing chiral agent and squeezed between the first and second transparent substrates, and first and second polarizers disposed outside the first and second transparent substrates, respectively,
   wherein:
   a twist angle of liquid crystal molecules of the liquid crystal layer is 155° to 210°, and
   a first angle between a polarizing axis direction of the first polarizer and an alignment direction of liquid crystal molecules of the liquid crystal layer in contact with the first transparent substrate, and a second angle between a polarizing axis direction of the second polarizer and an alignment direction of liquid crystal molecules of the liquid crystal layer in contact with the second transparent substrate, are each larger than 0° and smaller than 90°, and a sum of the first and second angles is 90°±7°.

2. The liquid crystal display according to claim 1, wherein a retardation R (nm) of the liquid crystal display unit has a value in the range of 90% to 110% of the below equation:

$$R=(-0.00327T+2.637)\lambda-0.2727T-142.7$$
$$(155 \leq T \leq 210)$$

where λ(nm) is an emission peak wavelength of said monochromatic light source and)T(°) is the twist angle of liquid crystal molecules of said liquid crystal layer.

3. The liquid crystal display according to claim 2, wherein the twist angle of liquid crystal molecules of said liquid crystal layer is 170° to 200°.

4. The liquid crystal display according to claim 2, wherein an optical transmission factor spectrum of said liquid crystal display cell has a minimum value at an emission wavelength of said monochromatic light source.

5. The liquid crystal display according to claim 2, wherein the monochromatic light is red color light or green color light.

6. The liquid crystal display according to claim 2, wherein the liquid crystal display unit is used as a vehicle mount display device.

7. The liquid crystal display according to claim 2, wherein the first angle between the polarizing axis direction of the first polarizer and the alignment direction of liquid crystal molecules of the liquid crystal layer in contact with the first transparent substrate, and the second angle between the polarizing axis direction of the second polarizer and the alignment direction of liquid crystal molecules of the liquid crystal layer in contact with the second transparent substrate, are each approximately 45°.

8. The liquid crystal display according to claim 2, wherein the first angle between a polarizing axis direction of the first polarizer and the alignment direction of liquid crystal molecules of the liquid crystal layer in contact with the first transparent substrate, and the second angle between the polarizing axis direction of the second polarizer and the alignment direction of liquid crystal molecules of the liquid crystal layer in contact with the second transparent substrate, are opposite to each other.

* * * * *